(12) United States Patent
Rodas et al.

(10) Patent No.: US 7,772,798 B2
(45) Date of Patent: Aug. 10, 2010

(54) SELF-POWERED HOME AUTOMATION INSTALLATION AND ITS METHOD OF OPERATION

(75) Inventors: Herbert Rodas, Encinitas, CA (US); Francis Valoteau, San Diego, CA (US)

(73) Assignee: Somfy SAS, Cluses (FR)

( * ) Notice: Subject to any disclaimer, the term of this patent is extended or adjusted under 35 U.S.C. 154(b) by 636 days.

(21) Appl. No.: 11/732,289

(22) Filed: Apr. 3, 2007

(65) Prior Publication Data

US 2008/0246339 A1   Oct. 9, 2008

(51) Int. Cl.
*H01M 10/44* (2006.01)
*H02J 7/00* (2006.01)

(52) U.S. Cl. .......................................... 320/101; 307/64

(58) Field of Classification Search ............ 160/7, 160/188; 320/101, 103; 49/409; 307/64, 307/66, 86; 340/7.32, 455, 485, 545.8, 545.9
See application file for complete search history.

(56) References Cited

U.S. PATENT DOCUMENTS

| 3,696,286 | A |   | 10/1972 | Ule |
| 4,100,427 | A |   | 7/1978  | Durand et al. |
| 4,122,396 | A |   | 10/1978 | Grazier et al. |
| 4,667,142 | A |   | 5/1987  | Butler |
| 5,387,858 | A |   | 2/1995  | Bender et al. |
| 5,760,558 | A | * | 6/1998  | Popat .......................... 318/480 |
| 5,779,817 | A |   | 7/1998  | Wecker |
| 6,081,096 | A |   | 6/2000  | Barkat et al. |
| 6,290,593 | B1 |  | 9/2001  | Weissbrich et al. |
| 2005/0215210 | A1 | | 9/2005 | Walker et al. |
| 2007/0130950 | A1 | * | 6/2007 | Serkh et al. ................... 60/698 |

FOREIGN PATENT DOCUMENTS

EP    1 333 706 B    2/2006
FR    2 330 180      5/1977

* cited by examiner

*Primary Examiner*—Edward Tso
*Assistant Examiner*—M'Baye Diao
(74) *Attorney, Agent, or Firm*—Procopio Cory Hargreaves & Savitch LLP; Noel C. Gillespie

(57) ABSTRACT

A method of operation of an electric self-powered home automation installation (10) comprising an actuator (1) allowing the movement of a movable screen (2) and a bipolar electric source (6), the actuator comprising a motor (3) for driving the movable screen and a means (4) for controlling the motor supply, the bipolar electric source comprising an in-situ rechargeable electric source (62, 63) and a non rechargeable electric source (61), the operation method comprising a first operation mode, wherein:
  the actuator is supplied only with the in-situ rechargeable electric source (62, 63) as long as the control means does not cause the motor to be supplied, whereas
  the actuator is at least supplied by the non rechargeable electric source (61) when the control means causes the motor to be supplied.

18 Claims, 2 Drawing Sheets

SELF-POWERED HOME AUTOMATION INSTALLATION AND ITS METHOD OF OPERATION

The invention relates to the field of movable and automated screens inside a building. These movable screens are for example Venetian blinds, pleated shades, roller blinds, curtains, sliding panels. These screens are operated by an actuator comprising a motor, a radio receiver and a power supply source.

BACKGROUND OF THE INVENTION

When such a screen assembly is self-powered (for instance battery-powered), problems with the consumption of the radio receiver may arise. Specifically in the above-mentioned applications, the motor is used episodically during the day, while the radio receiver must be able to receive a control command at any time. As a result, a much higher energy consumption is required for the radio receiver than for the motor, during the lifetime of an installation comprising such automated movable screens and their control devices.

DESCRIPTION OF THE PRIOR ART

Energy consumption problems of this kind have for example been reduced thanks to inventions described in documents EP 1 333 706 and US 2005/0215210.

In the latter case, the radio receiver is placed in sleep mode, but a periodic wakening of very short duration allows it to identify whether a radio signal is present, then whether the radio signal is actually intended for the receiver. If it is not, the receiver goes back to a sleep state immediately for a predetermined duration, this duration being longer than the duration of first wakening but nevertheless imperceptible for the user, for example one second. In this way energy from the battery-powered electric source supplying the receiver is saved as much as possible.

However, another problem arises when the battery-powered actuator is placed within radio range of a transmitter operating on the same radio frequency but with no relation to the actuator. This transmitter is for example a sensor regularly sending environmental information (temperature, illumination, air composition, etc) to other items of equipment in the building. In this case, the receiver is unnecessarily wakened too frequently and its autonomy decreases.

In the prior art, many documents relate to the usage of several energy sources in battery-powered devices.

Patent U.S. Pat. No. 6,081,096 describes methods for charging a principal storage means and an auxiliary storage means designed for a mobile telephone.

Patent U.S. Pat. No. 5,779,817 describes the cooperation of amorphous silicon or crystalline photovoltaic cells with automatic switching depending on the conditions of sunlight or load.

Patent application FR 2 330 180 describes the same series-parallel switching of photovoltaic cells according to the load.

Patent U.S. Pat. No. 3,696,286 describes automatic switching between a load direct supply via a photovoltaic solar panel and a load supplied via a battery recharged by said panel, the switching depending on sunlight conditions measured by a reference cell belonging to the panel.

Patent U.S. Pat. No. 4,122,396 describes, for a radiophonic receiver, manual means for switching between a photovoltaic type source with a storage capacitor and a non rechargeable source.

Patent U.S. Pat. No. 5,387,858 similarly describes switching between a rechargeable cell and a backup cell. This switching is controlled: an element detects the state of the rechargeable cell in order to switch the charge either to one or to the other cell.

Similarly, patent U.S. Pat. No. 4,667,142 proposes a supply via a solar panel if a dry battery is defective.

Patent U.S. Pat. No. 6,290,593 describes an automatic connection of a photovoltaic panel to supply a fan motor for a passenger compartment of a vehicle, depending on a measured temperature in the passenger compartment and depending on the state of charge of the vehicle battery.

In all the above mentioned devices comprising a rechargeable source, the latter is dimensioned so as to completely supply the electric equipment, at least when the charge in the rechargeable element is sufficient. This leads to a large and costly dimensioning of the photovoltaic panel and of the rechargeable storage element.

SUMMARY OF THE INVENTION

The object of the invention is to provide a method to operate a self-powered home automation installation that remedies the abovementioned disadvantages. In particular, the invention proposes a method of operation of a self-powered home automation installation comprising a photovoltaic panel and a rechargeable cell of low capacity, small space requirement and low cost. The invention further proposes a self-powered home automation installation using such a method.

The method according to the invention governs the operation of an electric self-powered home automation installation comprising a bipolar electric source and an actuator allowing the movement of a movable screen, the actuator comprising a motor for driving the movable screen and a means for controlling the motor supply, the bipolar electric source comprising an in-situ rechargeable electric source (62, 63) and a non rechargeable electric source (61). The operation method comprises a first operation mode, wherein:

the actuator is supplied only with the in-situ rechargeable electric source (62, 63) as long as the control means does not cause the motor to be supplied, whereas the actuator is at least supplied by the non rechargeable electric source (61) when the control means causes the motor to be supplied.

In the first operation mode, the actuator may also be supplied by the rechargeable electric source when the motor is supplied.

The maximum value of energy stored in the in-situ rechargeable electric source may be at least one hundred times less than the maximum value of energy stored in the non rechargeable electric source.

The current supplied by the in-situ rechargeable electric source may be at least one hundred times less than the current supplied by the non rechargeable electric source.

The bipolar electric source according to the invention is designed to supply a home automation actuator. It comprises an in-situ rechargeable electric source and a non rechargeable electric source. It comprises hardware and software means for applying the operation method defined above.

The hardware means may comprise a switching means for selectively connecting the terminals of the in-situ rechargeable and non rechargeable sources to the terminals of the bipolar electric source.

The switching means may be activated by comparing the intensity of the current supplied to the actuator with a predefined threshold.

The hardware means may comprise a diode disabled when the voltage at the terminals of the in-situ rechargeable source is greater than the voltage at the terminals of the non rechargeable source.

The in-situ rechargeable source may be supplied by a photovoltaic panel.

The self-powered home automation installation according to the invention includes an actuator comprising a motor for driving the movable screen, a unit for controlling the supply of the motor and includes a bipolar electric source as defined above.

BRIEF DESCRIPTION OF THE DRAWINGS

The appended drawing represents, as an example, two embodiments of a self-powered home automation installation according to the invention and a mode for carrying out the operation method according to the invention.

DESCRIPTION OF THE PREFERRED EMBODIMENTS

Figure 1:
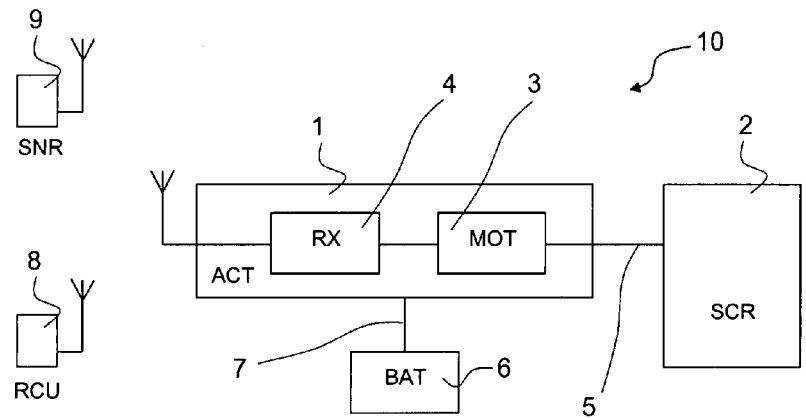
FIG. 1 describes an installation comprising an actuator supplied according to the method of the invention.

FIG. 1 describes an installation comprising an actuator supplied according to the method of the invention.

An actuator 1, referred to as ACT, is connected to a movable screen 2, referred to as SCR, placed in a building. Such a screen is used for covering or decorating the window ("Interior Window Covering") (such as a Venetian blind, a vertically slatted blind, a curtain), or is a furniture panel or sliding door panel, a multimedia projection screen that can be rolled up, or else a ventilation slat.

A motor 3 referred to as MOT, contained in the actuator, operates the movable screen 2. A control means 4, referred to as RX, makes it possible to control the motor supply to operate the movable screen. The control means comprises a receiver and, preferably, a radio receiver. It is further considered that all functions for managing the motor operations, for example storing end-of-travel positions, are contained in the control means.

The connection between the motor and the movable screen is achieved by a mechanical link 5.

An electric source 6, referred to as BAT, is connected to the actuator by means of a bipolar link 7 with two conductor wires in order to provide motor supply.

A remote control unit 8, referred to as RCU, makes it possible to send commands to the control means receiver by radio. Such command transmissions are relatively occasional. For example, there will usually be a command of complete deployment of the screen at the beginning of the day, a few adjustments in the middle of the day, a command of complete retraction of the screen at the end of the day.

An environmental sensor 9, referred to as SNR, also generates radio signals transmitted to other items of equipment in the same building. These transmissions occur at the same frequency, or in the same frequency range as those of the remote control unit. As the receiver detects these transmissions, it is regularly obliged to process the received signal until it establishes that this signal is not intended for the actuator ACT. The result of this is an excessive consumption of the actuator ACT.

Communication between the control means, the control unit and the environmental sensor could also be provided by means of transmission of signals other than radio, for example in the form of infrared or ultrasound waves.

Figure 2:
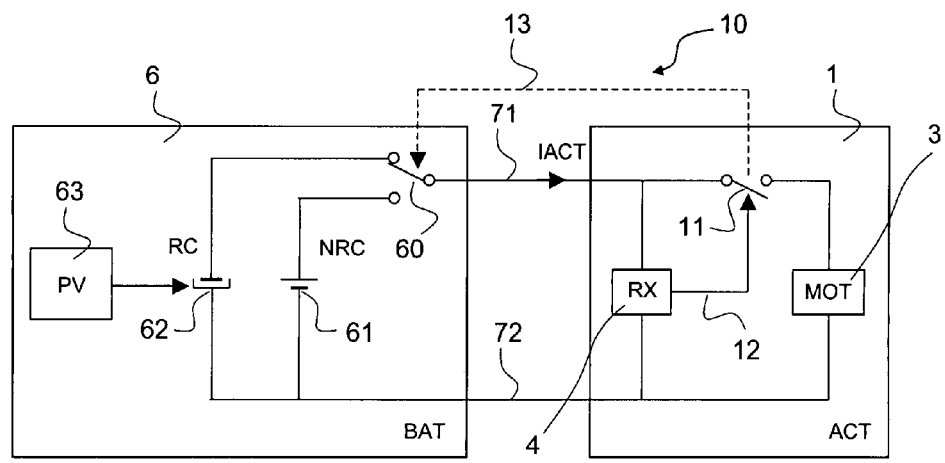
FIG. 2 describes a first embodiment of a self-powered home automation installation according to the invention.

FIG. 2 describes a hardware embodiment making it possible to apply the method according to the invention. This figure explains the relationship between the electric source 6 and the actuator 1.

The electric source 6 comprises a non rechargeable cell 61, referred to as NRC, for example a set of alkaline batteries or lithium batteries, and an in-situ rechargeable cell 62, referred to as RC, for example a supercapacitor or an accumulator. The rechargeable cell is connected to a transducer 63 converting ambient energy into electric energy, for example a photovoltaic panel PV.

A switching means 60 makes it possible to connect the bipolar link 7 either to the rechargeable cell RC or to the non rechargeable cell NRC. The bipolar link 7 comprises a first wire 71 and a second wire 72. The first wire is connected to the switching means, while the second wire is connected to each of negative pole of the two cells. The switching means 60 toggles the link between the first wire and one or other of the two positive poles of the cells.

The control means RX contained in the actuator ACT is directly connected to the wires of the bipolar link. It comprises internal periodic wakening means. If necessary it comprises means for adapting the supply voltage of the actuator, for example a voltage regulator.

The motor MOT is supplied through a motor activation switch 11, activated by the control means RX via activation means 12. The representation is here simplified, in fact the motor MOT must be able to be activated both in a first direction of rotation and in a second direction of rotation. The motor MOT contains, if necessary, a voltage up-converter to optimize its operation when the voltage delivered by the non rechargeable source is lower than the nominal voltage of the motor.

The activation of the motor activation switch 11 functionally leads to toggle the switching means 60 from a first position in which it links the first wire and the rechargeable cell RC, to a second position in which it links the first wire and the non rechargeable cell NRC. This functional operation is represented by the feedback arrow 13, in dashed line. In a first variant, the feedback 13 is anticipated, that is to say the switching means 60 is toggled slightly before the motor activation switch 11 is activated. The feedback may then be commanded directly by the control means RX.

In a second variant, the current IACT absorbed by the actuator controls the feedback. The measured intensity of this current, compared to a predefined threshold, causes or not the switching means 60 to toggle. The interest of this second variant is that it does not require a physical link between the electric source and the actuator, other than the two wires of the bipolar link, since the current is analyzed within the electric source.

Figure 3:
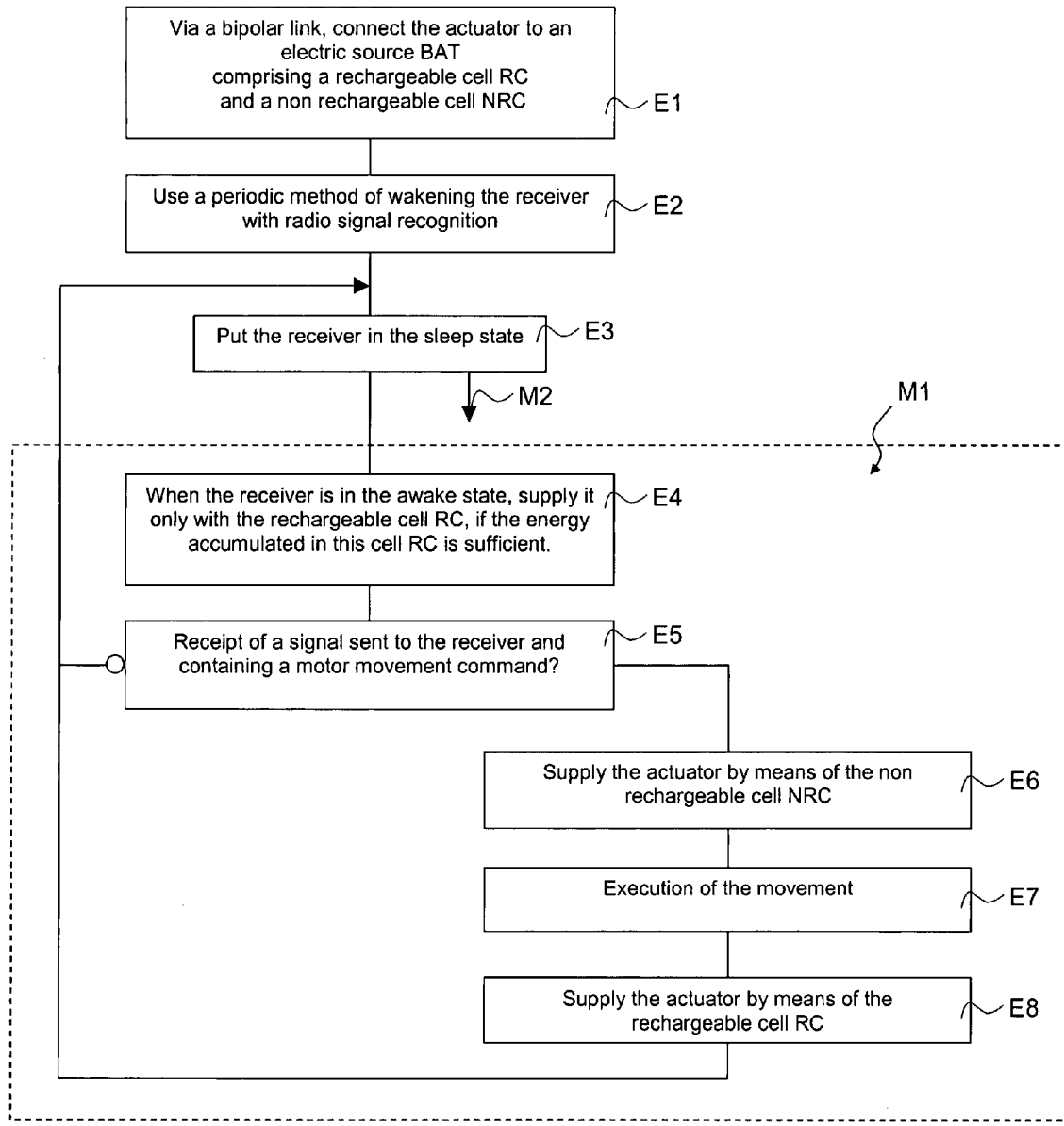
FIG. 3 describes a method of operation according to the invention.

FIG. 3 describes the method of operation according to the invention.

In a first step E1, the actuator is electrically connected to the electric source BAT as described above.

In a second step E2, a periodic sleeping-wakening mode of the receiver is activated in the actuator, with recognition and interpretation of any radio signal detected by the receiver after wakening, or with return to the sleep state if no signal is present.

In a third step E3, resulting from the second step, the receiver is put into the sleep state.

The following steps of the method are described according to a first operation mode M1, called energy optimization mode. Depending on the electric charge contained in the rechargeable cell, either this first mode M1 or another mode described later is activated.

The first mode M1 begins in a fourth step E4 of the method. If the quantity of energy in the rechargeable cell RC is sufficient, then this cell alone supplies the actuator during an awake state of the receiver.

During such an awake state, the radio signal is analyzed by the receiver during the fifth step E5 of the method. The receiver checks whether the radio signal is indeed intended for itself, and whether it contains a command to move the motor.

If not, the method loops to the third step E3, for sending the receiver in the sleep state. If yes, the method moves to the sixth step E6.

In the sixth step E6, the actuator assembly becomes supplied by the non rechargeable cell NRC. In other words, the motor MOT supply is defined by state of the motor activation switch 11 to satisfy the movement command, and, concomitantly, by the switchover of the switching means 60 in the second position.

Preferably, the switching means is placed in the second position before the motor activation switch is activated, to prevent the rechargeable cell from being totally discharged by the important current requirements as the motor starts up.

In the seventh step E7, the movement of the screen continues, for example up to the end of travel. The motor activation switch 11 is then deactivated.

Then in an eighth step E8, if the receiver has received no other movement command, the switching means 60 is placed in the first position (supplying the actuator via the rechargeable cell 62) and the receiver is put in the sleep state by returning to the third step E3.

The energy optimization mode M1 is applicable only as long as the energy contained in the rechargeable cell is sufficient. If this is not the case, there is then a switchover into a second operation mode M2, represented by the arrow M2 below step 3. In this mode, the actuator assembly is supplied by the non rechargeable cell, as in the prior art devices.

Figure 4:
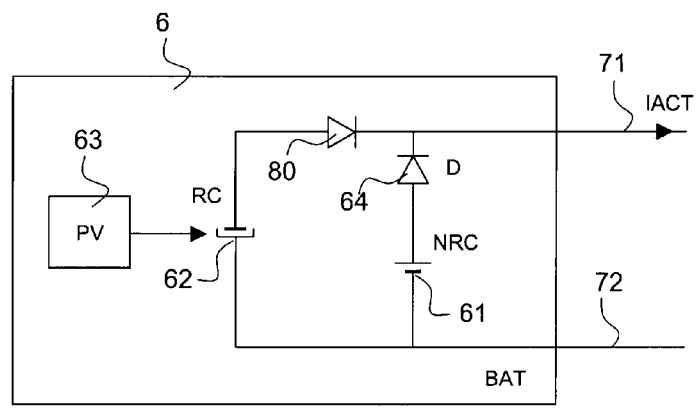
FIG. 4 describes a second embodiment of an electric source of a self-powered home automation installation according to the invention.

FIG. 4 describes a second embodiment of an electric source of a self-powered installation according to the invention. This embodiment differs from that of FIG. 2 in that the switching element 60 is replaced by a simple diode 64, referred to as D, where the anode is connected to the positive pole of the non rechargeable cell NRC, and where the cathode is connected both to the positive pole of the rechargeable cell RC and to the first wire 71, the rest of the figure being unchanged. optionally, a second diode 80 may also be placed in series in the branch comprising the rechargeable cell so as to prevent the rechargeable cell from being recharged by the non rechargeable cell.

In this case, the feedback 13 is defined by means of the current IACT absorbed by the actuator. In conditions of normal sunlight, the voltage at the terminals of the rechargeable cell is greater, even much greater, than the voltage at the terminals of the non rechargeable cell, and the diode D is reverse biased and disabled (non conductive state). The rechargeable cell then supplies all the electric current IACT absorbed by the actuator when only the receiver of the actuator is operating. It is known that, for one and the same photovoltaic panel area, the voltage of the panel depends on the serial and/or parallel arrangement of the individual cells included in it. It is therefore in no way incompatible to select or design a photovoltaic panel allowing both a high voltage and a reduced power.

It is important to note that, in all cases, the maximum value of electric energy contained in the rechargeable cell is at least one hundred times less than the maximum value of energy contained in the non rechargeable cell. Similarly, the current absorbed by the motor, particularly during a start-up, is at least one hundred times more than the current absorbed by the receiver when it is awake.

In other words, the rechargeable cell can satisfy only the energy needs of the sole control means comprising the receiver, and not the motor needs.

In the case of FIG. 4, when the receiver activates the motor activation switch, the current IACT becomes virtually equal to the current of the motor. The rechargeable cell RC discharges almost instantaneously when this current is absorbed, causing a virtually instantaneous drop of the voltage at its terminals.

When this voltage becomes equal to the voltage at the terminals of the non rechargeable cell, there is immediate conduction of the diode D and the non rechargeable cell provides the supply current of the actuator. In principle, the rechargeable element may contribute to the supply current of the actuator, but in a totally negligible quantity.

Preferably, the diode D has a low conduction threshold. A Shottky type diode is used for example.

The embodiments described have the advantage of using a recharging means of very low capacity but cumulated over time (the photovoltaic panel) to balance at least approximatively a process of repetitive discharges. The superfluous radio receptions cause a slight usage of energy but their accumulation would be sufficient to considerably degrade the battery life of the power source.

Another advantage of the invention is to allow substituting an electric source BAT according to the invention for a common electric source, consisting only of non rechargeable batteries.

The rechargeable portion is dimensioned according to the control means needs in energy and without any common measure with what would be necessary to supply the whole actuator assembly. The electric source BAT is therefore economically designed.

The invention mitigates the disadvantages of the devices of the prior art by clearly dissociating the roles of the rechargeable source and the non rechargeable source. The rechargeable source is intended to provide, if the sunlight and/or internal lighting are or have been sufficient, only the sole operation of the supply control means of the motor contained in the equipment. When the equipment responds to a control command, it is then systematically the non rechargeable source that is used. The result of this is a much reduced dimensioning constraint for the rechargeable source.

"Non rechargeable cell" or "non rechargeable electric source" means a cell or an electric source that cannot be recharged without intervention of an installer or a user. Therefore, a rechargeable battery or a set of interconnected (for example in series) rechargeable batteries is considered to form a non rechargeable cell or a non rechargeable electric source if they need an intervention of the installer or the user to be recharged. "Rechargeable cell" or "rechargeable electric source" means a cell or an electric source that can be recharged in situ by conversion of nonelectric ambient energy into electric energy.

The invention claimed is:

1. A method of operation of an electric self-powered home automation installation comprising a bipolar electric source and an actuator allowing the movement of a movable screen, the actuator comprising a motor for driving the movable screen and a means for controlling the motor supply, the bipolar electric source comprising an in-situ rechargeable electric source and a non-rechargeable electric source, the operation method comprising a first operation mode, wherein:

the actuator is supplied only with the in-situ rechargeable electric source as long as the control means does not cause the motor to be supplied, whereas the actuator is at least supplied by the non-rechargeable electric source when the control means causes the motor to be supplied.

2. The method of operation in accordance with claim 1, wherein, in the first mode of operation, the actuator is also supplied by the rechargeable electric source when the motor is supplied.

3. The method of operation in accordance with claim 1, wherein the maximum value of energy stored in the in-situ rechargeable electric source is at least one hundred times less than the maximum value of energy stored in the non-rechargeable electric source.

4. The method of operation in accordance with claim 1, wherein the current supplied by the in-situ rechargeable electric source is at least one hundred times less than the current supplied by the non-rechargeable electric source.

5. A bipolar electric source for supplying a home automation actuator, comprising an in-situ rechargeable electric source, a non-rechargeable electric source, which comprises hardware and software means for performing the method of claim 1.

6. The bipolar electric source in accordance with claim 5, wherein the hardware means comprises a switching means for selectively connecting the terminals of the in-situ rechargeable and non-rechargeable sources to the terminals of the bipolar electric source.

7. The bipolar electric source in accordance with claim 6, wherein the switching means is activated by the comparison of the intensity of the current supplied to the actuator with a predefined threshold.

8. The bipolar electric source in accordance with claim 4, wherein the hardware means comprises a diode disabled when the voltage at the terminals of the in-situ rechargeable source is greater than the voltage at the terminals of the non-rechargeable source.

9. The bipolar electric source in accordance with claim 5, wherein the in-situ rechargeable source is connected to a photovoltaic panel.

10. A self-powered home automation installation including an actuator comprising a motor for driving the movable screen, a unit for controlling the supply of the motor and including a bipolar electric source in accordance with claim 5.

11. The method of claim 1, wherein the bipolar electric source further comprises a photo-voltaic electric source configured to charge the rechargeable source.

12. The method of claim 1, wherein the electric self-powered home automation installation, further comprises a radio configured to receive a control signal, and the motor is configured to drive the movable screen based on the received control signal, and the method further comprises moving the movable screen based on the received control signal.

13. The method of claim 1, wherein the electric self-powered home automation installation, further comprises a control system coupled to an environmental sensor that monitors the environment near the environmental sensor, and the control system drives the motor to move the movable screen based on environmental information from the environmental sensor, and the method further comprises moving the movable screen based on the environmental information.

14. The method of claim 1, wherein a terminal of the in-situ rechargeable source is separated from a terminal of the bipolar electric source by a first diode and a terminal of the non-rechargeable source is separated from the terminal of the bipolar electric source by a second diode.

15. The bipolar electric source of claim 5, wherein a terminal of the in-situ rechargeable source is separated from a terminal of the bipolar electric source by a first diode and a terminal of the non-rechargeable source is separated from the terminal of the bipolar electric source by a second diode.

16. The bipolar electric source of claim 5, further comprising a photo-voltaic electric source configured to charge the rechargeable source.

17. The self-powered home automation installation of claim 10, further comprising a radio configured to receive a control signal,
wherein the motor is configured to drive the movable screen based on the received control signal.

18. The self-powered home automation installation of claim 10, further comprising a control system coupled to an environmental sensor that monitors the environment near the environmental sensor,
wherein the control system drives the motor to move the movable screen based on environmental information from the environmental sensor.

* * * * *